3,058,210
SEALING MIXTURE AND METHOD
Berl Charles Winters, Gainesville, Fla., assignor to Sperry Rand Corporation, Great Neck, N.Y., a corporation of Delaware
No Drawing. Filed Aug. 23, 1960, Ser. No. 51,462
11 Claims. (Cl. 29—472.7)

This invention relates to a method and materials for making strong vacuum-tight seals between the same or different materials of the types including metals and oxides thereof, ceramics and glasses.

In the production of electronic tubes and various electrical components for use at microwave frequencies, it is required that strong vacuum-tight seals be made between different types of materials, metals and ceramics being a common example. Innumerable sealing methods and mixtures of ingredients for making the seals have been used in the past. In making metal-to-ceramic seals, for example, a great many of the processes require a considerable number of steps, such as painting the ceramic with a mixture of metallic powders and then sintering, plating the sintered metallic powder with nickel and/or copper, again heating to a high temperature, and then assembling the components to be joined and brazing with a suitable brazing filler material. In addition to being laborious and time consuming, many of the processes require that the conditions and/or preparation of materials in the various steps be controlled within close tolerances. Sealing methods of the type described are costly and the reproduceability of acceptable seals often is somewhat less than desired.

I have discovered a unique mixture of sealing materials which permits the sealing process to be carried out by a single heating of the parts which have been assembled with the un-fired sealing material and a brazing filler material applied thereto. The seal which results is uncommonly strong, and the reproduceability of acceptable vacuum-tight seals is extremely high. The preparation of the sealing mixture is simple and requires relatively little time, and the process of sealing involves a minimum of critical restrictions.

It is an object of this invention to provide a mixture of materials for use in making strong vacuum-tight seals between the same or different materials of the types including metals and oxides thereof, ceramics and glasses, by a process requiring but a single heating.

Another object of the invention is to provide a mixture of sealing materials which permits the production of a metal-to-ceramic vacuum-tight seal by a single heating process.

A further object of this invention is to produce strong vacuum-tight seals between the same or different materials of the types including metals and oxides thereof, ceramics and glasses, wherein one or more of the materials to be joined has sufficient elasticity or plasticity to absorb expansion differences.

A further object of the present invention is to provide a mixture of sealing material which is easily prepared in a relatively short time.

Another object of this invention is to provide a process and material for easily and repeatedly producing strong vacuum-tight seals between members comprised of any of the materials including metals and oxides thereof, ceramics and glasses.

In describing my present invention I shall use as a specific example the materials and methods employed for producing a metal-to-ceramic seal, although as indicated above, and as will be described below, seals may be successfully made between other types of materials. Any of the metals commonly employed in electronic tubes or in microwave components may be joined to the same or other of those metals, or to ceramics and glasses, by the sealing mixture of my invention, and in all cases the seal may be made by a process involving but a single heating. Some of the metals commonly used in electronic tubes and microwave components include molybdenum, "Kovar," nickel, stainless steel, copper, and alloy 42 (42% iron—58% nickel).

The mixture of my invention is composed of molybdenum trioxide powder and liquid manganous nitrate, wherein the manganous nitrate ranges from 5 to 50 percent by weight of the mixture. Methanol or distilled water is added as a liquid vehicle to obtain a suspension of the desired consistency. An example of a specific mixture which I have found to be excellent for producing very strong vacuum-tight seals with great reproducibility is as follows: 10 grams of molybdenum trioxide (99% purity), 3 cc. manganous nitrate and 3 cc. methanol or distilled water. The molybdenum trioxide, as obtained from the supplier, was in powder form whose particle size was approximately 25 microns, or less.

The mixture of the above ingredients is stirred for several minutes until a substantially homogeneous suspension is obtained. The short mixing time is one of the advantageous features of the mix of this invention in that mortaring or ball milling for extended periods of time, as is required in the preparation of other known sealing mixes, are not necessary. The amount of methanol or distilled water in the mixture determines its viscosity, and the desired viscosity is in turn determined by the porosity of the parts to be sealed and by the method of applying the mix to said parts. The ingredients mix well together and form a mixture of smooth consistency which is easily applied and adheres well to the parts. The mix may be applied by any well known method such as painting, spraying, sponging, rolling or dipping. The only function of the methanol or water in the mixture is to serve as a liquid vehicle to obtain the desired viscosity of the composition. It completely evaporates at a relatively low temperature early in the heating step and does not further enter into the process. The liquid vehicle should be non-contaminating, that is, should not alter the properties of the other ingredients of the composition or the parts to be sealed. Another substance possessing the stated properties of the liquid vehicle is acetone. Of course, if an acceptable consistency of the mixture can be obtained with only the powdered molybdenum trioxide and liquid manganous nitrate, no other liquid vehicle need be used. The thickness of the mix on the parts to be joined is in accordance with standard practices and may be applied in as thin a coating as will assure complete coverage of the desired areas.

After the mix is applied to the areas of the respective parts to be joined, a brazing filler material is placed between or near the intended seal so that upon melting the brazing metal will be in the interspace between the parts to be joined, or will flow therein. In making seals between metals and polycrystalline alumina ceramics comprised of from 85 to 100 percent alumina, I prefer to employ pure copper as the brazing filler metal, although other known filler materials such as gold, silver, indium, tin, or alloys thereof, may be employed.

When the parts to be sealed are assembled with the mix and brazing material applied thereto, the assembly is heated in a dry reducing atmosphere to a temperature above the melting temperature of the brazing metal for a sufficient time to insure the formation of an acceptable seal. Standard brazing techniques are followed. When employing pure copper as the brazing metal, I heat the assembled ceramic and metal parts to a temperature of approximately 1125° C. for approximately two to three minutes. The time and temperature are interrelated so that if the temperature is raised the time may be reduced, and vice versa. In practice I employ a continuous-feed furnace having a reducing atmosphere at a maximum temperature of approximately 1185° C. The assembly to be joined passes through the furnace in approximately 15 to 20 minutes, although the assembly to be sealed reaches a maximum temperature of approximately 1125° C. and remains thereat for approximately two to three minutes. I have found that the quality of the seals begins to deteriorate when the temperature exceeds approximately 1350° C.

The reducing atmosphere preferably should be dry inasmuch as I have found that the wetter the atmosphere the weaker the seal becomes. I employ a reducing atmosphere composed of 75 percent hydrogen and 25 percent nitrogen of dew point −60° C. Said seals have been made in a reducing atmosphere of dew point +30° C., although it is to be emphasized that the drier the atmosphere the stronger the seal. The heating may be performed in a dry hydrogen atmosphere, or any other dry reducing atmosphere. In making metal-to-ceramic seals between materials commonly used in electronic tubes with the mixture having the specific proportion of ingredients stated above, using pure copper as the brazing metal and in a reducing atmosphere of dew point from −60° C. to −90° C., I consistently have obtained vacuum-tight seals whose tensile strengths are around 14,000 p.s.i.

The flexibility and the differences in the coefficients of expansion of the materials to be sealed may govern the type of brazing filler material to be used. Pure copper forms an extremely strong seal but may not have sufficient plasticity to avoid rupturing of the vacuum-tight seal if the coefficients of expansion of the two materials joined are poorly matched. Fine silver is more plastic and may be used with success where poorly matched coefficients of expansion exist between the materials to be sealed. For seals of high strength the reducing atmosphere should be quite dry when using silver as the brazing metal, although vacuum-tight seals consistently have been made with silver in an atmosphere of dew point +30° C.

The unusual success of the mixture of this invention for making strong vacuum-tight seals is believed to be attributable to the fact that even at the lower temperatures in the heating cycle manganese is fairly active with the materials to be joined. Additionally, the composition comprising the molybdenum trioxide, manganous nitrate and liquid vehicle wets the surfaces of the materials to be joined and makes intimate contact therewith at room temperature.

Successful metal-to-glass seals have been produced with the molybdenum trioxide-manganous nitrate mix of this invention using silver-copper eutectic brazing alloy.

Also, a mica window for use in microwave components has been brazed to a nickel frame using the mix of this invention and a pure tin brazing metal.

Strong vacuum-tight seals between ceramic and oxidized stainless steel have been made using the mix of this invention wherein the manganous nitrate constituted 50 percent by weight of the mix. Copper brazing metal was used.

It thus may be seen that the molybdenum trioxide and manganous nitrate sealing mix of this invention is easily prepared with a minimum of time and effort, is easy to work with, and readily wets the surfaces to be joined. The mix of this invention provides the further advantage that the seal may be made in a single heating operation in a reducing atmosphere after the mix and brazing material have been applied to the areas of the respective parts to be sealed. Standard techniques are employed throughout the mixing and heating operations.

The mix of this invention also may be applied to a component part to be sealed and then sintered in the event that the parts are to be metalized before final assembly and brazing, although as stressed above, the mix affords the advantage that the seals may be formed in a single heating process.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A mixture of materials suitable for use in making seals between the same or different materials including metals and oxides thereof, ceramics and glasses, consisting of molybdenum trioxide and manganous nitrate in which the manganous nitrate ranges from 5 to 50 percent by weight of said mixture.

2. The mixture claimed in claim 1 including a volatile, non-contaminating liquid vehicle admixed with said mixture to produce a homogeneous suspension of said mixture.

3. A composition for use in making strong vacuum-tight seals between the same or different materials including metals and oxides thereof, ceramics and glasses, consisting of powdered molybdenum trioxide and liquid manganous nitrate in which the manganous nitrate ranges from 5 to 50 percent by weight of said composition.

4. A composition for use in making strong vacuum-tight seals between the same or different materials including metals and oxides thereof, ceramics and glasses, consisting of powdered molybdenum trioxide and manganous nitrate in which the manganous nitrate is approximately 35 percent by weight of said composition.

5. A composition of materials to be applied to parts to be joined, said parts being of the same or different materials from the group including metal, and oxides thereof, ceramics and glasses, said composition consisting of a mixture of molybdenum trioxide powder and manganous nitrate in which said manganous nitrate amounts to 5 to 50 percent by weight of said mixture, and a volatile non-contaminating liquid vehicle admixed with said mixture to produce a substantially homogeneous suspension of said mixture therein.

6. The composition claimed in claim 5 wherein said manganous nitrate is 35 percent by weight of said mixture.

7. The process of making a strong vacuum-tight seal between two members of the same or different materials from the group comprising metals and oxides thereof, ceramics and glasses, comprising the steps of stirring in a volatile non-contaminating liquid vehicle the ingredients molybdenum trioxide powder and manganous nitrate wherein the latter of said ingredients ranges from 5 to 50 percent of the total weight of said two ingredients, applying the mixture obtained from said stirring to the parts of said members to be sealed, placing brazing filler material in a position so that upon melting it will flow between the parts of said members to be sealed, assembling said members in their desired position and heating the assembly in a reducing atmosphere to a temperature above the melting temperature of said brazing filler material for a length of time sufficient to bring said brazing filler material to the molten state.

8. The process claimed in claim 7 wherein said reducing atmosphere is a dry atmosphere which ranges from +30° C. to −90° C. dew point.

9. The process of forming a strong vacuum-tight seal between members of the same or different materials including metals and oxides thereof, ceramics and glasses, comprising the steps of mixing molybdenum trioxide powder with liquid manganous nitrate to obtain a homogeneous mixture thereof, said manganous nitrate ranging from 5 to 50 percent by weight of said mixture, applying said mixture to the respective areas of said members to be joined, assembling said members in their desired relative positions, applying a brazing filler material at the junction of said two members, and heating said assembly in a dry reducing atmosphere to a sufficient temperature for a sufficient length of time to melt said filler metal.

10. The process claimed in claim 9 wherein said mixture is composed of 35 percent by weight of said manganous nitrate.

11. The process claimed in claim 9 wherein the mixing step recited therein includes the addition of a non-contaminating liquid vehicle.

References Cited in the file of this patent

UNITED STATES PATENTS

| | | |
|---|---|---|
| 2,041,802 | Wilson et al. | May 26, 1936 |
| 2,667,432 | Nolte | Jan. 26, 1954 |
| 2,800,710 | Dunn | July 30, 1957 |
| 2,904,456 | Nolte | Sept. 15, 1959 |

FOREIGN PATENTS

| | | |
|---|---|---|
| 483,156 | Great Britain | Apr. 13, 1938 |